United States Patent [19]
Shimizu et al.

[11] 3,819,349
[45] June 25, 1974

[54] METHOD AND APPARATUS FOR PRODUCING WATCH CRYSTALS

[75] Inventors: Hiroshi Shimizu, Kasugai; Shunsaku Sakakibara; Ryoichi Ishigure, both of Nagoya, all of Japan

[73] Assignee: Agency of Industrial Science & Technology, Tokyo, Japan

[22] Filed: Dec. 15, 1972

[21] Appl. No.: 315,680

[52] U.S. Cl............................ 65/63, 65/92, 65/106, 65/165, 65/260, 65/287
[51] Int. Cl............................................ C03b 23/02
[58] Field of Search............... 65/57, 61, 62, 63, 67, 65/102, 103, 106, 107, 230, 244, 273, 275, 105, 58

[56] References Cited
UNITED STATES PATENTS

| | | | |
|---|---|---|---|
| 2,215,027 | 9/1940 | Blau.................................. | 65/58 X |
| 2,367,111 | 1/1945 | Fowler et al........................ | 65/63 X |
| 3,582,304 | 6/1971 | Bognar............................... | 65/275 X |
| 3,582,454 | 6/1971 | Giffen............................... | 65/105 X |

*Primary Examiner*—Robert L. Lindsay, Jr.
*Assistant Examiner*—Richard Pace
*Attorney, Agent, or Firm*—Kurt Kelman

[57] ABSTRACT

Disclosed is method and apparatus for producing semi-finished "mesa" type watch crystals whose opposite surfaces have a precise flatness nearly equalling that of the finished crystal. According to the principle of this invention a glass sheet is, after being finely ground, heated and softened around the annular perimeter part of the glass sheet, which part is to be shaped into the bent flange portion of the mesa type crystal. In the course of heating the invasion by flames over the opposite surfaces of the glass sheet beyond the annular perimeter part thereof is completely prevented, thus assuring that the fine-ground surfaces of the glass sheet are not spoiled by flames, retaining a precise flatness nearly equalling that of the finished crystal.

5 Claims, 5 Drawing Figures

METHOD AND APPARATUS FOR PRODUCING WATCH CRYSTALS

BACKGROUND OF THE INVENTION

This invention relates to method and apparatus for producing watch crystals or watch glasses, and more particularly to method and apparatus for producing semi-finished "mesa" type crystals with a precision in shape and size almost as high as that of the finished product.

Hitherto, two different methods for producing watch crystals have been proposed and practically used. One of these methods comprises the steps of supplying molten glass to one of the male and female moulds, pressing the molten glass thus charged with the other mould to produce the basic concave form the crystal (See FIG. 1), and finally grinding the periphery and opposite surfaces of the semi-finished product into a final product (see FIG. 2). The other method comprises the steps of holding a glass plate on a concave holder by catching the perimeter of the glass plate, heating the glass plate at the softening temperature of glass to allow the center area of the glass plate to descend towards the bottom of the concave recess of the holder by gravity, and finally griding the concavo-convex glass plate into the final product.

The former method tends to provide a coarse-surfaced glass plate as a result of the direct contact with the mould during the solidification of the molten glass. Press work is very difficult unless a certain large amount of glass material is charged in the mould, and for this reason the amount of glass in the semi-finished product is about eight times as large as the amount glass of in the final crystals. This necessitates time-wasting and considerable grinding work and at the same time results in the waste of glass material.

The method last mentioned provides a clear and smooth-surfaced glass plate because the solidification of the soften glass plate is conducted apart from the surface of the concave recess of the holder. However, the semi-finished product thus obtained has uneven thickness as a result of uncontrollable formation by gravity. Therefore, it is most likely that the crystals thus produced will distort the figures and the watch hands on the dial of the wrist watch.

In the course of production, the periphery of the semi-finished product is subjected to pressure in the softened state, and is forcefully curved. As a natural consequence a trace of pressure is left on the crystal surface, and therefore it will not be a high quality product.

Presently, the thin and flat type wrist watches have gained popularity. Accordingly, demand for precision-finished crystals which do not distort the figures and the hands on the face of thin and flat type wrist watches is ever increasing. It is necessary that a crystal which is adapted to use in a thin and flat type wrist watch have a "mesa" shape. Such crystal is herein called a "mesa" type crystal. The "mesa" type crystal is generally low and flat, but it still has sufficient room to allow the hands to rotate without being caught at the periphery of the crystal. By the prior art the glass cannot be shaped into the final product without deterioration of the surface flatness of the semi-finished product in the course of heating and softening the same.

Alternatively it has been proposed that a glass block be ground so as to produce a crystal having a perfect flatness in the inner surface thereof. However, the flange portion of the semi-finished crystal which is being machined constitutes an obstacle to the grinding work, and therefore it is practically impossible to produce a crystal having completely flat surfaces. As is readily understood, this grinding process results in wasted time and difficult work even if it should provide "mesa" type crystals of high quality, and therefore the crystal thus obtained will be intolerably expensive. Hitherto, there has been no practical method for the efficient production of optical precision "mesa" type crystals having perfectly flat surfaces on both sides.

SUMMARY OF THE INVENTION

The object of this invention is to provide method and apparatus for manufacturing optical precision crystals free from the defects or disadvantages above mentioned.

The principle of this invention is that: first, the opposite surfaces of a sheet glass which is per se amenable to grinding work, is subjected to optical grinding (and ornamental glass cutting, if desired), and second, the periphery of the sheet glass thus polished is heated and softened without spoiling the finished surfaces of the glass by flames or deformation of the same by negative pressure applied thereto, and finally the sheet glass is pressed and shaped by dies, thus efficiently providing "mesa" type crystals whose shape and size is nearly equal to those of the final product.

BRIEF DESCRIPTION OF THE DRAWINGS

The above and still further object, features and advantages of this invention will be understood from the following description when considered in connection with the drawings in which.

DESCRIPTION OF THE PREFERRED EMBODIMENTS

Figure 5:
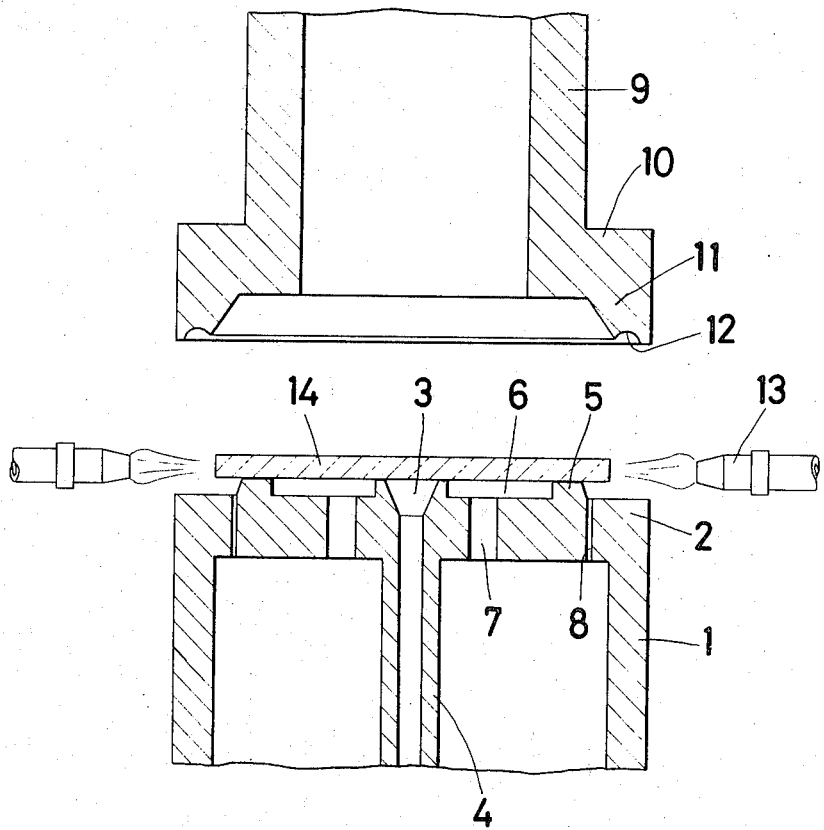
FIG. 5 is a sectional view of an apparatus according to this invention.

Referring to FIG. 5, an embodiment of the apparatus according to this invention is shown. A cylindrical forming bed is indicated by reference numeral 1. A male die 2 is integrally connected to the top of the forming bed 1. The forming bed 1 is put on a turntable (now shown). A raised portion 5 is provided on the outer periphery of the male die 2, and a suction aperture 3 and associated suction pipe 4 are provided in the center area of the male die. The suction pipe 4 is connected to a vacuum pump (not shown). A recess portion 6 and apperutres 7 are provided to the top of the male die between the raised portion 5 and the central suction aperture 3. Escape apertures 8 are made in the top of the male die outside the raised portion 5. A reciprocating press member having a female die 10 integrally connected to the end thereof, is positioned above the male die in opposite relationship. The press member is connected to a hydraulic press (not shown) via a piston rod 9. A semi-circular-in-section groove 12 is provided to the diverging end 11 of the female die 10. Heating means 13 is positioned around the periphery of the sheet glass at the same level as the sheet glass.

In operation, a sheet glass 14 of proper shape and size is prepared, and the opposite surfaces of the glass are preheated. The glass thus preheated is put on the male die 2, and is fixed by applying negative pressure to the glass through the suction aperture 3. Then, the forming bed 1 is rotated at a given constant speed, and the periphery of the glass is uniformly heated and softened by heating means 13. The rotation of the forming base is stopped and the female die 10 is then applied to the glass.

Virtually no change results in the flatness of the surface of the crystal formed by the method and apparatus of this invention. This is because the atmospheric pressure in the annular recessed zone 6 between the suction aperture 3 and the raised portion 5 tends to prevent flames from invading in the recesses, thus avoiding the damage of the surface of the glass. Also, the atmospheric pressure prevents the deformation of the disk which otherwise would be caused as a result of the application of the negative pressure to the center of the disk. The raised portion 5 functions as a heat sink, thus allowing the heat which is supplied from the burners to conduct from the heated perimeter of the glass disk to the raised portion and the associated male die. Therefore, the inner part of the glass disk bounded by the raised portion remains below the temperature at which glass will start softening. The escape apertures 8 permits the escape of the air which otherwise would be trapped between the male die and the perimeter of the glass disk with the result the bent flange portion of the "mesa" type crystal is deformed. The semi-circular-shaped-in-section groove 12 of the female die 10 functions to prevent cracking which otherwise would occur in the course of forming the bent flange portion of the crystal. Advantageously the contact area between the glass surface and the die surface is reduced to the minimum, and accordingly the damage to the optical glass surface caused thereby is reduced to the minimum.

The following example describes how a superior watch crystal was produced under specific operating condition by means of this invention. The invention is, of course, not limited to the conditions given here.

Figure 1:
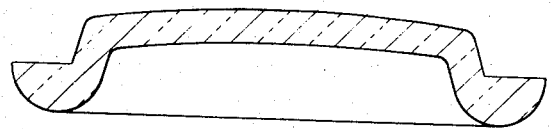
FIG. 1 is a sectional view of a semi-finished crystal produced according to the conventional method.
Figure 2:
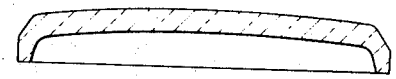
FIG. 2 is a sectional view of the crystal obtained by grinding the semi-finished product of FIG. 1 into a plano-concave crystal.
Figure 3:
FIG. 3 is a sectional view of a semi-finished "mesa" type crystal produced according to this invention.
Figure 4:
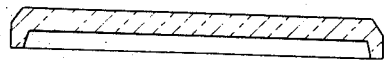
FIG. 4 is a sectional view of a "mesa" type crystal obtained by grinding the perimeter of the semi-finished product of FIG. 4.

An optical glass disk which was 32 mm in diameter and 2 mm thick, was prepared, and the opposite surfaces of the glass disk thus prepared were ground and polished. The glass disk was then preheated up to approximately 350°C. The glass disk thus preheated was put on the male die of the forming bed, and was fixed by applying a negative pressure to the glass disk through the central suction aperture. Then, the forming bed was rotated at the speed of 30 r.p.m., and at the same time the perimeter of the glass disk was heated and softened by applying gas flames from the gas burners to the perimeter of the glass disk. The gas burners were so positioned that the gas flame was as high as two thirds of the thickness of the glass disk, and at the same time that the gas flame extended approximately 4 mm over the perimeter part of the disk. The rotation of the forming base was ceased, and the female die was lowered, thus shaping the perimeter part of the glass disk at the pressure of 3 kg/cm² (see FIG. 3). The glass disk thus shaped was removed from the die, and was annealed in a furnace. Finally, only the perimeter of the glass disk was ground to the final shape and polished (see FIG. 4).

The opposite surfaces of the crystal thus produced showed no trace of being injured by flames, and the crystal had a precision of surface flatness equalling that which the glass disk had before being subjected to the flame-heating process.

The description above is directed to the disk type crystal, but it should be noted that this invention can be equally applied to production of square or elliptical crystals.

The crystals produced according to this invention have opposite surfaces of almost perfect flatness. The flatness of the glass surface is as high as about 0.2 $\mu$, and therefore it is not absolutely necessary to subject such crystals to finish grinding.

Advantageously, the amount of glass material is, nevertheless, ten times as low as that required in the conventional method, and since the semi-shaped product has a shape and dimensions nearly equalling those of the finished product, the time involved for finish grinding work is drastically decreased.

What is claimed is:

1. A method for producing a watch crystal, said method comprising the steps of: preparing a glass sheet having a desired shape, optically grinding opposite surfaces of said glass sheet, putting and holding said glass sheet on a die and applying negative pressure to a small area at the center of said glass sheet, applying atmospheric pressure to a large area between the center and the perimeter of the glass sheet at the side facing said die, supporting the glass sheet near the periphery by a raised die portion, heating and softening the periphery of the glass sheet, and pressing said periphery of the glass sheet onto said raised die portion with a counter die to form said glass sheet into the final shape of a watch crystal, thus providing a watch crystal bearing no trace of being injured by heating and application of negative pressure.

2. The method according to claim 1 further comprising the step of draining air trapped in the space between said perimeter of said glass sheet and said raised die portion while forming bent flange portion of said watch crystal.

3. An apparatus for producing watch crystals which apparatus comprises a forming base; a male die integrally connected to the top of said forming base, said male die having a raised portion on the periphery of said die, a suction aperture at the center of said die and an annular recessed zone of large area between said raised portion and said suction aperture; a reciprocating press member positioned above said forming base; a female die integrally connected to the end of said reciprocating press member, and heating means.

4. The apparatus according to claim 3 wherein said male die has air escape apertures on the periphery of said male die outside of said raised portion.

5. The apparatus according to claim 3 wherein said female die has a semi-circular-in-section groove provided on the annular end of the diverging end projection of said male die.

* * * * *